C. A. HYDE.
SAFETY BOLT AND NUT LOCK.
APPLICATION FILED NOV. 25, 1914.
1,175,148.
Patented Mar. 14, 1916.
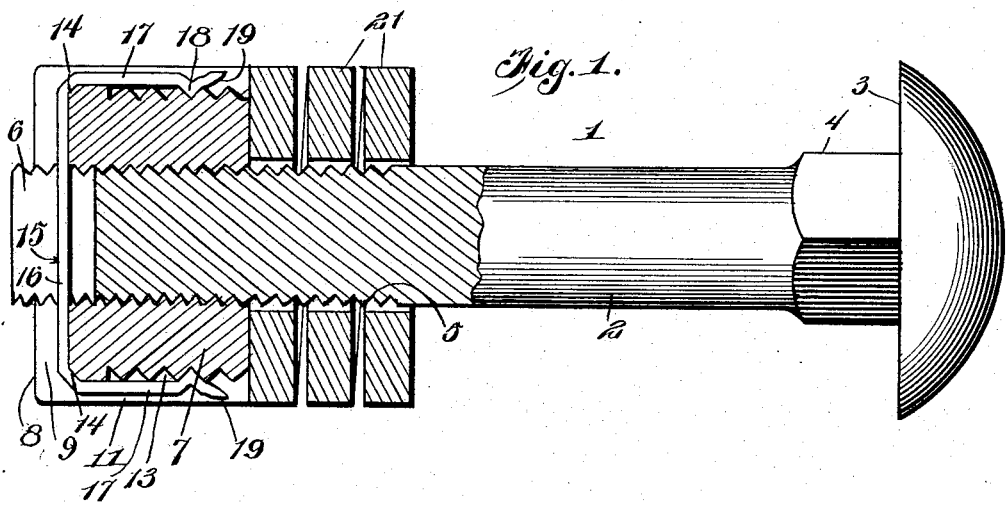
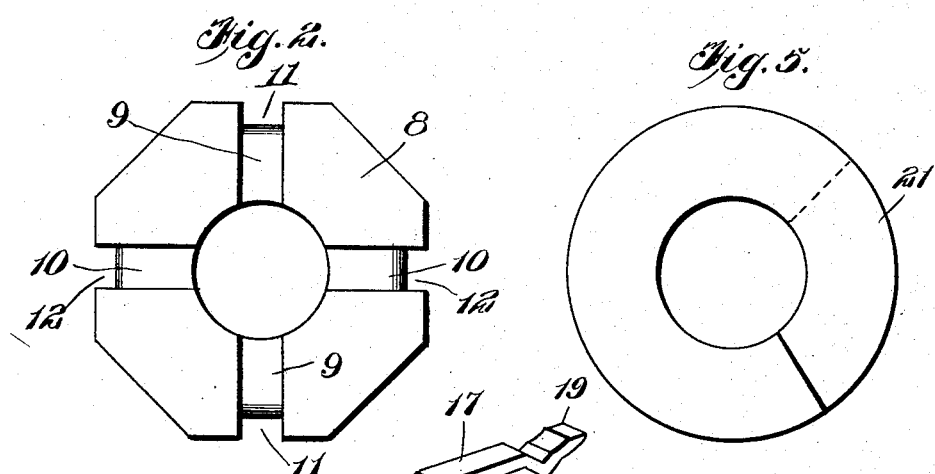
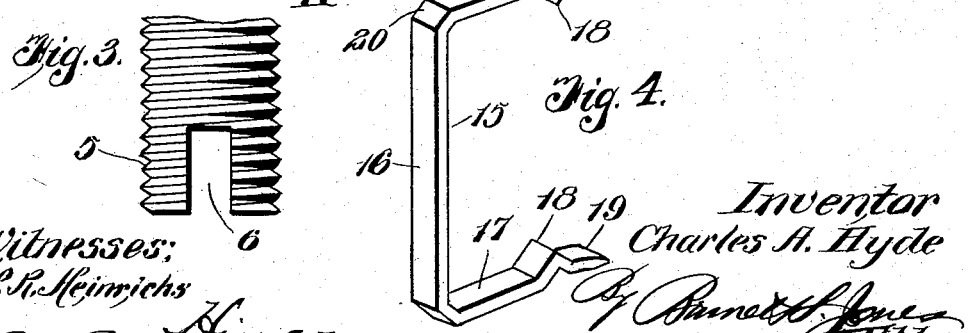
Witnesses:
Inventor
Charles A. Hyde

UNITED STATES PATENT OFFICE.

CHARLES A. HYDE, OF CLEAR SPRING, MARYLAND.

SAFETY-BOLT AND NUT-LOCK.

1,175,148. Specification of Letters Patent. Patented Mar. 14, 1916.

Application filed November 25, 1914. Serial No. 873,930.

*To all whom it may concern:*

Be it known that I, CHARLES A. HYDE, a citizen of the United States, residing at Clear Spring, in the county of Washington and State of Maryland, have invented certain new and useful Improvements in Safety-Bolts and Nut-Locks, of which the following is a specification.

My invention relates to safety bolts and nut locks, and its primary object is to provide a novel construction of bolt, nut and locking device whereby a simple, strong, durable and efficient structure is produced for locking the nut against any liability of casual disconnection or retrograde rotation.

A further object of the invention is to provide a nut locking means including a spring clip adapted to be interlocked with the bolt and nut in a convenient manner, and which, when applied, can only be removed under certain conditions, and thus avoid liability of miscreants tampering with the bolt and nut.

A further object of the invention is to provide, for use in conjunction with the improved bolt, nut and locking device, a spiral spring washer having substantially the same tensile strength as the bolt and adapted to permit free expansion and contraction of the parts coupled by the bolt under heat and cold without stretching the bolt, whereby a secure connection is maintained at all times to secure absolute safety, a desideratum in the use of the device in railroad construction for coupling adjoining rails and other similar uses.

The invention consists in the features of construction, combination and arrangement of parts hereinafter described and claimed, reference being had to the accompanying drawings, in which:

Figure 1 is a view, mainly in longitudinal section, showing the application of my invention to a bolt and nut; Fig. 2 is an outer face view of the nut; Fig. 3 is a detail view of the outer end of the bolt; Fig. 4 is a perspective view of the spring locking clip; and Fig. 5 is an end view of the spiral spring or washer.

Referring to the drawing, 1 designates a bolt which may be in general of ordinary construction, including a shank 2 having at one end a head 3 and an angular portion 4, and having at its opposite end screw threads 5, except that the bolt is preferably made of somewhat greater diameter than ordinary bolts and its head is also preferably made somewhat larger and the length of its threaded surface increased, all with the object of strengthening the bolt and increasing the extent of adjustment of the nut to render the bolt capable of sustaining all of the imposed strains when used as a fastening member in railway track construction and any other structures where safety of connection is a factor of primary importance.

As shown, the threaded end of the bolt shank is formed with a diametrically extending groove 6, and the nut 7, provided to engage the threaded end of the bolt, is formed in its outer face 8 with two sets of alined transverse grooves 9 and 10 arranged at right angles to each other and intersecting each other at the center of the bolt, which grooves respectively communicate with longitudinal grooves 11 and 12 formed in the sides of the nut and extending between its inner and outer faces. The inner walls of these grooves 11 and 12 are each formed with a longitudinal series of locking teeth or notches 13, and the outer ends of said walls are formed with beveled surfaces, as indicated at 14.

For the purpose of securing the nut to the bolt, I provide a fastening comprising a substantially U-shaped spring clip 15, consisting of a body or cross piece 16 and spring arms 17 bent at right angles to said body and in parallel relation to each other. Each of these arms is struck up to provide an inwardly extending V-shaped locking projection 18 and a releasing extremity 19 projecting outwardly at an oblique angle thereto. The body or cross piece 16 is of a length coinciding with the diameter of the nut and is adapted to be received in either of the pairs of grooves 9 and 10 and to extend diametrically across the nut, while its arms 17 are adapted to project into the grooves 11 or 12, so that the body or cross piece 16 will enter the groove 6 in the end of the bolt and thus fasten the nut to the bolt against any possibility of turning movement.

It will be understood, of course, that the fastening device or clip is adapted to be applied by a sliding movement, and it will be noted that the cross piece and arms thereof are of less width and thickness than the width and depth of the grooves, from which it will be apparent that when the clip is applied it will lie entirely within the grooves and wholly within the periphery of the nut, so that it cannot be struck by extraneous objects and loosened or accidentally sprung out of locking engagement with the nut. The projections 18 of the spring locking arms are adapted to be held by the spring action of said arms in engagement with certain of the notches 13 with such a degree of spring force that the arms cannot be casually displaced or released from locking engagement by a miscreant or unauthorized person or by any other than a trackman or workman having a lever or tool of a proper form and size to enter in the spaces between the extremities 19 of the fastening and the sides of the nut and operated to force the arms of the fastener out of locking engagement with the nut. It will be evident, however, that the fastener may be easily slid into locking position and to facilitate this and render it easier the fastener is provided at the points of junction of its body portion and arms with beveled surfaces 20 conforming to the beveled portions 14 and which may be engaged easily by the thumb and one of the fingers of the hand so that the fastener may be conveniently held and slipped into locking position.

In applying the fastener the projections 18 of the spring locking arms thereof are brought into engagement with the beveled surfaces 14 of the walls of the grooves 11 or 12, with which the fastener is to be engaged, and the fastener forced inward under pressure, the projections 18 in such action sliding over the said beveled surfaces 14, by which the arms of the fastener will be spread so that they will slide easily into the grooves, thus allowing even a very strong spring fastener to be applied with readiness and facility, while at the same time the fastener when fully applied will be shielded by the nut itself and held from either working loose or from being accidentally disconnected.

For the purpose of increasing the efficiency of the bolt and nut lock, I provide a coiled take-up spring or washer 21, which preferably is of spiral form, and consists of three spiral convolutions, sufficient in number to secure the desired expansion and contraction of the washer and to permit of the requisite range of expansion and contraction of the bolt. This spring has substantially the same tensile strength as the bolt, or its resistance to compression is equal to that of the force which is necessary in order to stretch or elongate the bolt. This washer is placed upon the shank of the bolt and comes between the nut and one side of the structure clamp, the head 3 bearing against the other side of such structure, which may be the elements of a rail joint, as will be readily understood.

It is well known that in the use of ordinary bolts the expansion and contraction of the coupled parts under heat and cold is often such that under expansion the bolt is elongated, so that when the parts subsequently contract the fastening is loose, ordinary spring washers being inefficient to take up the slack or looseness. It will be evident, however, that by the use of my improved washer spring, having substantially the same tensile strength as the bolt, the spring itself will take up the pressure of expansion and sustain it, thus relieving the bolt from the pressure and preventing elongation thereof, while upon the contraction of the parts the spring will expand and maintain the elements tightly in engagement with one another.

Owing to the features of construction set forth, a safety bolt and nut are provided which will be found of great efficiency for use in fastening or coupling parts where safety of connection is a factor of importance, since the construction is such that the nut cannot work loose or the fastening become casually disconnected, while the spring washer permits of the necessary range of expansion and contraction, while relieving the bolt of all stretching strains.

Having thus described my invention, I claim:

In a nut lock, the combination with a bolt having the threaded portion of its shank provided with a slot, of a nut having sets of diametrical transverse grooves in its outer face intersecting each other at right angles, and longitudinal grooves in its sides communicating with the first-named grooves, the inner walls of said longitudinal grooves being provided with locking notches, and said walls being also provided with beveled portions at their points of intersection with the coöperating transverse grooves, and a spring fastener consisting of a body portion adapted to be disposed within the slot of the bolt and either of the pairs of transverse grooves in the nut, and provided with spring arms adapted to occupy diametrically disposed longitudinal grooves of the nut, said arms having in-struck projections to engage the locking notches and terminal portions bent outwardly at an oblique angle, the portions of the fastener being arranged to lie wholly within the periphery of the nut, said beveled portions being adapted for coöperation with said oblique terminal portions of the fastener to guide and spread the spring arms of the fastener into engagement with the longitudinal grooves in the operation of slidably applying said fastener.

In testimony whereof I affix my signature in presence of two witnesses.

CHARLES A. HYDE.

Witnesses:
PALMER TENNANT,
D. ELMER WOLF.

Copies of this patent may be obtained for five cents each, by addressing the "Commissioner of Patents, Washington, D. C."